Figure 1:
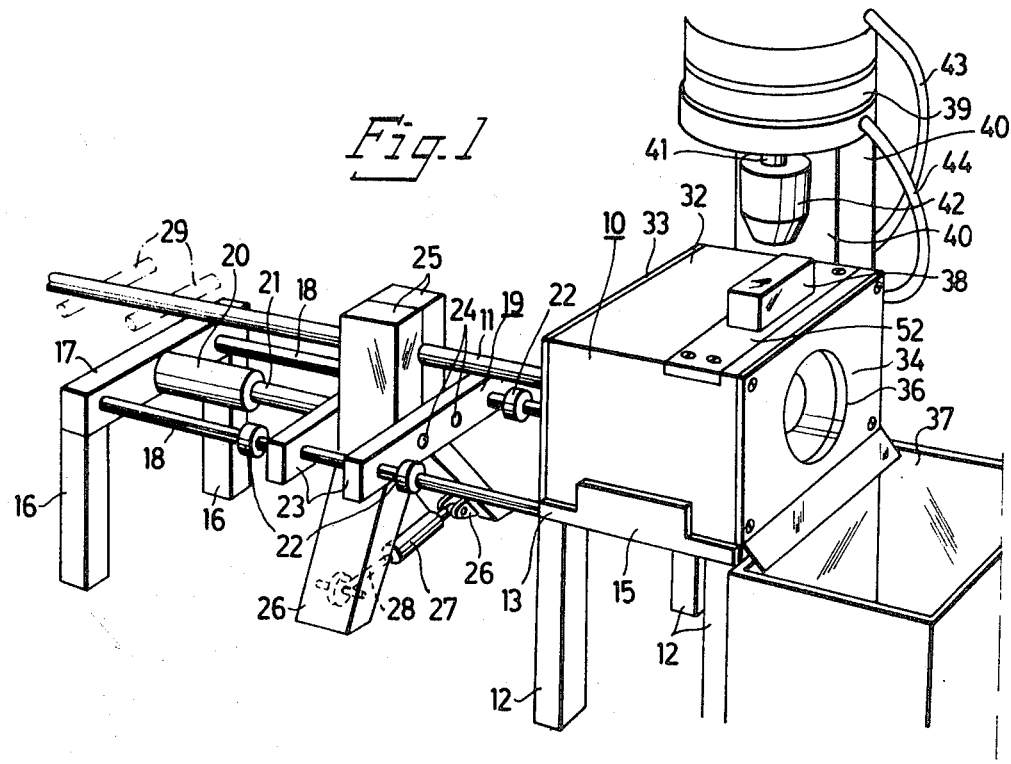

United States Patent [19]

Strandell et al.

[11] 3,735,656
[45] May 29, 1973

[54] ARRANGEMENT IN AND RELATING TO HIGH SPEED IMPACT COLD PLANAR FLOW SHEARING APPARATUS

[75] Inventors: Per-Olof Strandell, Taby; Carl-Erik Ridderstrale, Lulea, both of Sweden

[73] Assignee: HJO Mekaniska Verkstad K & V., Smedberg, Hjo, Sweden

[22] Filed: May 12, 1971

[21] Appl. No.: 142,611

[52] U.S. Cl. .......................83/198, 83/391, 225/103
[51] Int. Cl. .............................................B26d 3/16
[58] Field of Search.............................83/198, 391; 225/103, 104, 105, 97, 1

[56] References Cited

UNITED STATES PATENTS

| 488,659 | 12/1892 | McCool et al. | 83/198 |
| 1,318,249 | 10/1919 | Winters | 83/198 |
| 2,136,831 | 11/1938 | Vuilleumier | 225/103 UX |
| 3,273,434 | 9/1966 | Hausman et al. | 225/103 X |
| 3,362,272 | 1/1968 | Grosse | 83/198 |
| 3,452,572 | 7/1969 | Brandey et al. | 83/198 X |

Primary Examiner—Frank T. Yost
Attorney—Stevens, Davis, Miller & Mosher

[57] ABSTRACT

An improvement in high speed impact, cold planar flow shearing apparatus having a stationary shearing die and a movable shearing member and with which the shearing member is subjected to an impact force of such magnitude that the member is given at least sufficient energy to stress the stock to the point of fracture. The improvement consists of an axial support member located adjacent the movable die member and extending into the path of the stock so as to support the stock axially during the initial portion of the shearing sequence but so as to be out of engagement therewith before fracture of the stock is completed. The improvement also includes means which positively stop downward movement of the shearing member substantially immediately the slug has been sheared from the stock.

3 Claims, 5 Drawing Figures

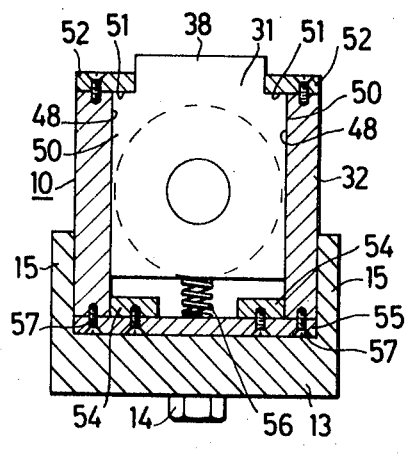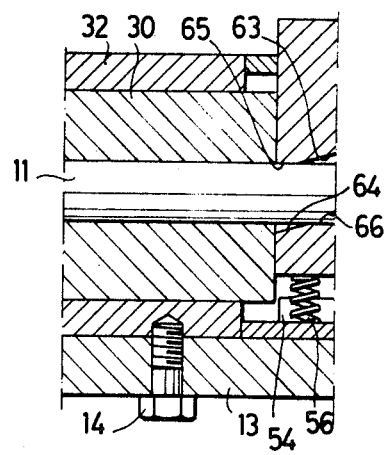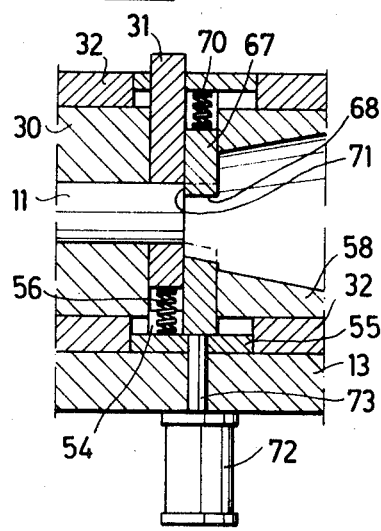

ARRANGEMENT IN AND RELATING TO HIGH SPEED IMPACT COLD PLANAR FLOW SHEARING APPARATUS

The present invention relates to an arrangement in high speed impact cold planar flow shearing apparatus of the type having a stationary shearing die and a movable shearing member, means for feeding stock to the shearing position and means for applying an impact force to the movable shearing member of such magnitude that the movable shearing member is imparted at least the amount of energy necessary to stress the stock in shear to the point of fracture.

It has been known for many years that metal can be stressed to the point of fracture by subjecting it to high speed impact forces. Although not fully understood, it is thought that fracture occurs in the metal as a result of interaction of two or more stress waves propagated therein at high impact speeds and that the width and intensity of the shear zone is important in determining the condition of the sheared edge of stock and the slug.

It is also known that when cropping short slugs the presence of bending stresses unfavourably affect the shape of the shear zone and render the slug unsuitable for many purposes.

Attempts have been made to eliminate this drawback by clamping the die end of the stock during the shearing process, thereby counteracting the effect of the bending stresses. Other solutions consist of axially supporting the die end of the stock until fracture of the stock is complete and then removing the support to allow the cropped slug to be ejected from the apparatus. Although reducing the extent to which the slug is deformed as a result of bending stresses, the solutions proposed hitherto create another problem, insomuch as the sheared surface of the slug is caused to slide over the cut end surface of the stock as the movable shearing member completes its stroke. This causes overfolds to be formed on the shear surfaces and, in extreme cases, welding of the cropped slug to the die end of the stock.

Consequently, one object of the invention is to provide high speed impact cold planar flow apparatus of the aforementioned type with means which axially support the die end of the stock during the initial portion of the shearing sequence but which permit the remainder of the shearing sequence to be effected with the die end of the stock unsupported axially, thereby permitting axial movement of the slug in the feed direction immediately it becomes separated from the stock.

It is a further object of the invention to provide means which positively stop the moving shearing member substantially as soon as fracture of the stock is completed.

Thus, in this way the bending stresses are counteracted at the initial moment of impact and the slug is free to move out of contact with the cut end surface of the stock as soon as the slug becomes separated from the stock.

Accordingly, in accordance with the invention there is provided in high speed impact shearing apparatus a movable shearing member and a stationary die, actuator means for delivering an abrupt impact force to the movable shearing member to force it against the stock and shear it, means for supporting the die end of the stock axially during the initial part of the shearing sequence, said means being arranged so that the die end of the stock is moved out of engagement therewith before fracture of the stock is complete, and means for positively stopping the movable shearing member substantially immediately the stock has been sheared to the point of fracture.

Figure 2:
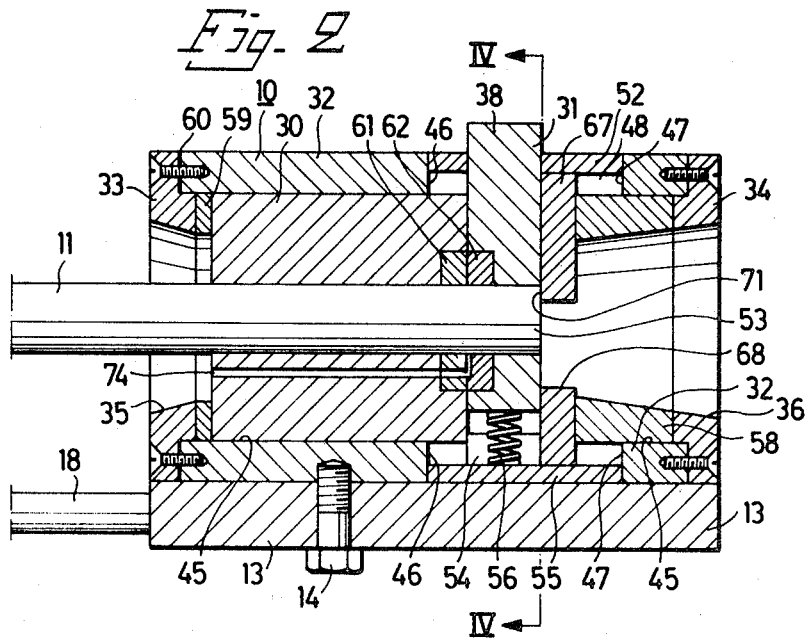

The invention will now be described with reference to a number of embodiments illustrated in the accompanying drawing, of which FIG. 1 illustrates by way of example a high speed impact cold planar flow shearing apparatus embodying the invention, FIG. 2 is an axial section view of the shearing assembly forming part of the apparatus illustrated in FIG. 1 and shows one embodiment of an axial support means used together therewith, FIG. 3 shows another embodiment of an axial support means active in axially supporting the stock prior to and during the initial portion of the shearing sequence, FIG. 4 is a section view taken through the line IV—IV in FIG. 2, and FIG. 5 is a partial axial section view of the shearing assembly which in this embodiment presents clearance surfaces, to enable small clearances to be used between the stock and the active surfaces of the shearing members.

FIG. 1 illustrates a tool assembly generally identified at 10, carried by a stand which also supports means for feeding stock to the tool 10. The stand has a number of legs 12 which support a plate 13, on which the tool 10 is mounted and secured, for example, by means of a bolt 14 as shown in FIGS. 2–4. The plate 13 has upwardly extending side members 15 (FIGS. 1 and 4) for axial alignment of the tool 10. The stand also includes a trestle having legs 16 and an upper cross-piece 17 from which two parallel guide rods 18 extend to the plate 13.

Displaceably mounted on the guide rods 18 is a slide 19 which can be moved backwards and forwards along the rods by means of a double-action piston-cylinder assembly, the cylinder 20 of which is connected with the cross-piece 17 and the piston rod 21 of which is connected with the slide 19. Movement of the slide can be restricted and adjusted by means of stops 22 in the form of sleeves which are mounted for movement along the guide rods 18 and which can be locked in desired positions therealong by appropriate means. The slide 19 comprises two cross-members 23 which are through-passed at the ends thereof by the guide rods 18 and which are connected together by two rods 24 extending parallel with the guide rods 18 and of which only the ends are shown in FIG. 1. Each of the rods 24 pivotally supports a jaw 25 of a gripping means mounted on the slide. The jaws 25 extend upwardly from the rods 24 and have downwardly directed portions 26 which form an angle to each other and between which a double acting piston operates, the cylinder 27 of said piston being pivotally connected with one portion 26 while its piston rod 28 is pivotally connected with the other portion 26. A roller path or the like, as indicated at 29, may be arranged to support the rear end of the stock 11 fed to the tool assembly 10, and optionally also to feed said stock to the assembly.

The components of the tool assembly 10 which effect the actual shearing operation comprise a stationary shearing die 30 and a movable shearing member 31 cooperating therewith. The components 30 and 31 are housed in a holder means which includes a casing 32 provided with end plates 33, 34, which present openings 35, 36 to allow the stock 11 to be fed into the tool assembly 10 and to allow the slugs separated from the stock to be ejected from the tool assembly into a collecting container 37 or the like. The tool assembly 10 and associated components is described below in more detail with reference to FIGS. 2 and 4, in which the aforementioned tool assembly components are clearly illustrated. As is clearly shown in FIG. 1, there projects from the casing 32 an upper portion 38 of the shearing member 31. For the purpose of subjecting the shearing member 31 to a momentary impact force which acts in a direction towards the stock 11 and which is sufficient to impart to the shearing member a quantity of energy sufficient to stress the stock to the point of fracture, there is situated above the tool assembly 10 an actuating means, which in the exemplary embodiment comprises a powerful pneumatic piston arrangement. The cylinder 39 of the piston arrangement is supported by a post 40 suitably resting directly on the foundation. Attached to the free end of the piston rod 41 is a heavy weight 42, which is arranged to strike portion 38 of the shearing member 31. In FIG. 1 there is also shown compressed air lines 43 and 44, which issue into the cylinder 39. Such lines must, of course, also be arranged for the cylinders 20 and 27. The impact velocity and mass of the impact tool 42 are normally selected so that the quantity of energy transmitted to the shearing member 31, which should have a small mass in comparison with the impact tool, is substantially totally consumed during the shearing sequence. Appropriate velocities and energy are obtained for different stock and stock cross sections, by the selection of mass and air pressure in the cylinder 39.

In the case of large changes, either the weight or the impact tool is changed, while in the case of small changes it is sufficient to reset the feed pressure to the cylinder 39.

When cropping slugs from the stock 11 using the apparatus shown in FIG. 1, the stock, resting on the path 29, is fed between the jaws 25, which are held open by piston 27, 28, and into the tool assembly 10. The piston rod 21 is held retracted so that the portion 23 of the slide 19 situated nearest the trestle 16, 17 bears against the stop member 22 situated nearest the trestle. Prior to this, the stop members 22 on the guide rods 18 are adjusted so that the distance between two stop members on the same rod 18 minus the length of the slide 19 coincides with the length of the slugs to be cropped from the stock 11. Pressure medium is then applied to the cylinder 27 in such a way that the piston rod 28 moves outwards and actuates the gripping means, in a manner whereby the stock 11 is gripped and held between the jaws 25. Pressure medium is now passed to the cylinder 20 in such a way that the piston rod 21 moves outwards and moves the slide 19 into abutment with the stop members 22 situated nearest the tool assembly 10. Pressure medium is then passed to the cylinder 39 through line 43, so that the weight 42 is accelerated towards and strikes the portion 38 of the shearing member, which is thus momentarily imparted the quantity of energy necessary to stress the stock in shear to the point of fracture. Suitably immediately thereafter, the piston rod 41 is returned to the retracted position, by supplying pressure medium through the line 44. During the shearing operation the portion of the stock 11 located outside the stationary die 30 is held against axial movement by the jaws 25. Subsequent to completion of the shearing operation, pressure medium is supplied to the cylinder 27, to retract the piston rod 28 and to open the jaws 25; whereupon pressure medium is passed to the cylinder 20, to return the slide 19 into abutment with the stop member 22 situated nearest the trestle 16, 17. The apparatus is now in starting position for a new working cycle. The apparatus may of course include a system for automatically controlling and coordinating the movement of slide 19, jaws 25 and weight 42, so that the slugs can be separated from the stock 11 automatically, until the stock is consumed.

The casing 32 is shown in detail in FIGS. 2 and 4, and comprises a block having an axially through-passing bore 45 and a recess of rectangular cross-section which passes from the upper side of the block to its underside, and which presents transversely extending defining surfaces 46, 47 and longitudinally extending defining surfaces 48. The stationary die 30 has the form of a cylindrical sleeve, the cylindrical surface of which is preferably a light push fit in the bore 45. The sleeve 30 has a central, axially through-passing hole, through which the stock 11 is adapted to pass with relatively close tolerances, suitably a light sliding fit. In order to obtain a high quality cut surface, there should only be a slight clearance between stock 11 and the bore of the sleeve 30, hence the fit should be as close as the dimension tolerances of the stock 11 permit. The end surfaces of the sleeve 30 are ground to a high surface finish and are perpendicular to the long axis of the sleeve. The shearing member 31 is guided for limited movement in the recess defined by surfaces 46, 47, 48. It has the form of a flat plate exhibiting a thickness which preferably equals the length of the slugs to be cropped. The shearing member 31 is provided with an axially throughpassing hole 49 which embraces the stock 11 with a light sliding fit. The two side surfaces of the shearing member extending transversely of the tool assembly 10 are ground perpendicular to the long axis of the hole. The two longitudinally extending side surfaces 50 of the shearing member 31 are ground and are suitably coated with, for instance, a film of plastic material, such as nylon, to reduce friction and eliminate wear of the surfaces 48 in the vertical recess of the casing 32. At the junction between the aforementioned upper portion 38 of the shearing member 31 and the member 31 proper are located shoulders 51, which by engaging stop surfaces 52 detachably mounted on the casing 32 determine the upper position of the shearing member. The two stop members 52 are fixed in a recess in the casing by means of screws and their position vertically can be adjusted, for instance by means of thin shims or the like, so that the bore in the sleeve 30 and the hole in the shearing member 31 coincide exactly when the member 31 is in its upper position, to enable through feed of the stock 11.

The portion 38 of the shearing member 31 projecting from the casing 32 is provided with an essentially planar upper surface, which serves as an impact surface and an energy transmitting surface when struck by the energy emitting mass 42. Upon being struck, the shearing member moves rapidly downwardly, to separate the end portion 53 of the stock. Downward movement of the shearing member 31 is restricted by one or two cooperating solid stop members 54. The members 54 are detachably mounted on a cross piece 55 forming the bottom of the vertical recess of sleeve 32. The stop members 54 are preferably adapted so that they can be exchanged easily, and so that the downward movement of the shearing member is stopped as soon as the stock has been stressed to the point of fracture. It can be mentioned by way of example that the radial distance moved by the slug before it is separated from the stock is roughly between 8 - 25 percent of the diameter of the stock and that when cropping slugs from a brass rod 21 mm in diameter for instance, the length of downward travel is from 1.7 to 1.8 mm, and for soft carbon steel for cold forging the length of travel is from 4 to 4.5 mm.

The shearing member 31 is returned to starting position by a spring 56. The shearing member 31, however, can be returned by other means, for instance by means of a pneumatic cylinder or an air cushion. A liquid-braked piston cylinder arrangement can replace both the spring 56 and the stop members 54, and can also be utilized for absorbing the surplus energy of the tool, i.e. the energy remaining subsequent to the separating operation.

The cross member 55 carrying the stop members 54 and the return spring 56 is secured in the casing 32 by means of counter-sunk bolts 57. The longitudinal position of the shearing member 31 in the tool 10 is fixed by a further cylindrical sleeve 58 in a manner whereby the shearing member lies immediately adjacent the end surface of the sleeve 30. The diameter of the axial hole of the sleeve 58 is greater than the length of the cross section of the stock together with twice the length of travel of the shearing member, and hence cropped slugs fed out through the sleeve 58 are less likely to jam. As illustrated, the hole may suitably be conical in shape in order to facilitate ejection of the cropped slugs from the machine. It is relatively easy to change the sleeve 58 and, if one shearing member 31 is changed for another of considerably different thickness, can be replaced with a new sleeve 58 of appropriate length. The stationary die 30 is pressed lightly against the shearing member 31, to eliminate the clearance therebetween. Pressing of die 30 against the shearing member 31 and the position of the die and the member longitudinally is effected and determined respectively by means of the end plates 33 and 34, which are bolted to the casing. Small changes in the position of the tool components accomodated in the casing can be made when changing the shearing components, by inserting or removing annular washers, shims or the like between, for instance, the end plate 33 and the sleeve 30. Such a washer is shown at 59 in FIG. 2. The position of the aforesaid tool portions can also be fixed by placing thin, intermediate plates in the gap 60 between the end plate 33 and the casing 32.

As previously mentioned, the tool assembly 10 is secured to the plate 13 solely by means of bolts 14. The tool assembly can thus be exchanged easily, and while one assembly 10 is being used in a machine a new assembly can be prepared for different stock and slug dimensions, so that the apparatus can be adapted rapidly to stock of differing dimensions and a high production capacity is obtained. this exchange system has another advantage whereby the tool assembly can be prepared and all movements and measurements exactly set at the work shop instead of at the machine. When cropping slugs from metal stock having a relatively low mechanical strength, for instance aluminium alloys and brass, the tool members 30, 31 may, to advantage, be made of hardened tool steel, while in the case of steel stock it is more expedient, from the point of view of wear, to use hard metal inserts, as shown at 61 and 62 in FIG. 2, which are bonded or soldered in the recess in the movable shearing member 31 and the stationary die 30, respectively.

Feeding of the stock through the machine and ejection of the cropped slugs can be facilitated without impairing the quality of the cut surface if, in accordance with the embodiment of FIG. 5, the hole extending through the shearing member 31 is provided at the top thereof with a clearance angle 63 at the side remote from the die 30, and at the bottom with a clearance angle 64 at the side facing said die 30. This construction enables work to be effected with very small clearances between the stock 11 and the active surfaces 65 and 66 of the shearing member without creating difficulties when feeding the stock through the machine and ejecting the cropped slugs therefrom, whereby the quality of the cut surface is improved.

As previously mentioned, when cropping stock into short slugs with an apparatus of the aforementioned type for example, the face of the slug becomes deformed as a result of the high bending forces acting on the stock in the plane of shear and as a result of sliding contact between the face of the cropped slug and the stationary die end of the stock. In order to prevent such deformation, the cold planar flow shearing apparatus of the invention is provided with means for axially supporting the die end of the stock during the initial portion only of the shearing sequence, whereafter axial support is removed to allow the shearing stroke to be completed with the stationary die end of the stock unsupported axially and the cropped slug to move out of contact with the stationary die end of the stock immediately the shearing sequence is completed.

An embodiment of the means for axially supporting the stationary die end of the stock during the initial moment of stressing the stock in shear is illustrated in FIG. 2. FIG. 2 is an axial section view of the shearing assembly used with the illustrated apparatus and shows among other things the movable shearing member 31, the stationary die 30 and the stock 11. Fixedly mounted adjacent the movable shearing member 31 is a plate 67 having a through passing hole 68 which is larger than the cross sectional area of the stock. The plate 67 is detachably fixed to the cross-piece 55 and to the members 52 by appropriate means (not shown) and is arranged so that during the initial moment of the shearing process a peripheral edge surface of the stock bears against a corresponding peripheral edge surface 71 of the hole 68, and takes up the bending forces created during the initial moment of impact on the shearing member 31. The term peripheral surface as used here means the surface extending radially in the vicinity of the boundary lines of the hole 68 and of the end surface of the stock.

Since the distance moved radially by the slug before it is separated from the stock is roughly proportional to the diameter or thickness of the stock, the depth of the respective engaging peripheral edge surfaces can be adapted so that the peripheral edge surface of the slug is freed from engagement with the peripheral edge surface of the hole 68 before the slug is freed from the stock. In this way the slug is able to move axially in the direction of feed as soon as it has been separated from the remainder of the stock, thereby avoiding surface to surface sliding contact of the opposing faces of the cropped slug and the stationary die and of the stock. In the illustrated embodiment, subsequent to being separated from the stock, the slug is ejected from the apparatus by means of air under pressure fed to the end of the slug via a line 74 from a source not shown.

FIG. 3 illustrates an alternative embodiment of the axial support means shown in FIG. 2. With this embodiment the plate 67 is capable of moving radially and is held urged against the cross-piece 55 by means of a pressure spring 70, or by some other expedient means, in a manner whereby a peripheral edge surface of the end of the oncoming stock bears against and is axially supported by a corresponding peripheral edge surface 71 of the plate 67. As with the stationary axial support of FIG. 2, the radial extension of the stock engaging surface 71 is adjusted according to the diameter or thickness of the stock being cropped so that the slug is freed from engagement with the surface 71 before the shearing sequence is completed. Radial movement of the plate 67 in the embodiment of FIG. 3 is effected by means of a pressure piston 72, the piston rod 73 of which pushes against the lower edge of the plate. The length of stroke of the piston 72 is adapted so that the hole 68 in the plate 67 is brought into register with the die end of the stock when the piston rod is fully extended. Thus should the slug jam for some reason or other, the hole 68 can be brought in line with the stock, as shown with ghost lines, by extending the piston rod 73 and the slug removed by feeding the stock through the hole 68.

Although the invention has been described with reference to a stationary tool assembly, it can also be used to advantage with tool assemblies which are movable in the direction of feed of the stock, for example of the type in which the movable tool assembly has a resilient stop means with a built in contact maker/breaker, and with which the tool assembly accompanies the stock during the latter part of its travel until the stock strikes the axial support member, whereupon a signal is sent to the movable shear member actuating means.

What is claimed is:

1. An apparatus for shearing portions from a stock comprising:
    a. a shearing tool assembly having a stationary die and a movable shearing member;
    b. actuator means to momentarily deliver an impact force to said shearing member to force it against the stock and shear it;
    c. means to support the die end of the stock against axial movement during the initial part of the shearing stroke, the arrangement of said means being such that the die end of the stock is moved out of engagement with said means before fracture of the stock is complete,
    d. means to stop the stroke of the shearing member substantially immediately after the stock has been sheared to the point of fracture.

2. The apparatus of claim 1, characterized in that the shearing member can be moved between a first position, in which it is substantially out of engagement with the stock from which portions are to be separated, and a second position in which it bears against the stop means, said stop means having means for automatically returning the shearing member to the first position.

3. The apparatus of claim 2, particularly for separating end lengths of an elongated body in which the stationary die presents a bore essentially fitting the cross section of the body and adapted to guide the body for longitudinal movement thereof, the shearing member being movable substantially perpendicularly of the bore and arranged adjacent the mouth of the stationary die, a hole adapted to receive the end of the body, the bore and the hole having a shape complementary to the shape of the body so that both the end portion of the body and the end portion of the adjacent body portion are prevented from bending during the shearing operation.

* * * * *